United States Patent [19]

Guerra

[11] 4,415,958
[45] Nov. 15, 1983

[54] DEVICE FOR ILLUMINATING TRANSPARENCIES

[75] Inventor: John M. Guerra, Brighton, Mass.

[73] Assignee: Polaroid Corporation, Cambridge, Mass.

[21] Appl. No.: 266,082

[22] Filed: May 21, 1981

[51] Int. Cl.$^3$ .............................................. F21V 7/00
[52] U.S. Cl. .................................... 362/301; 353/78; 353/79; 353/119; 355/67; 355/119; 362/97; 362/223; 362/263; 362/374; 362/297
[58] Field of Search ................. 362/97, 217, 223, 362, 362/374, 375, 296, 300, 307, 310, 263, 297, 301, 346, 396; 355/27, 43, 67, 60, 65, 66, 113, 119; 353/43, 68, 74, 78, 79, 119

[56] References Cited

U.S. PATENT DOCUMENTS 4,200,392 4/1980 Suatek .................................... 355/43
4,329,045 5/1982 Rees ........................................ 355/67

Primary Examiner—Donald P. Walsh
Attorney, Agent, or Firm—Francis J. Caufield

[57] ABSTRACT

A lighting device for uniformly illuminating transparencies. The device comprises an open-ended, rectangular parallelepiped-shaped housing having specularly reflective interior surfaces and a partially reflecting/diffusing opal glass screen positioned over the housing open end. An elongated electronic flash tube is mounted within the housing in a manner whereby a substantially uniform illumination is provided at the exterior surface of the opal glass screen when the flash tube is fired.

5 Claims, 4 Drawing Figures

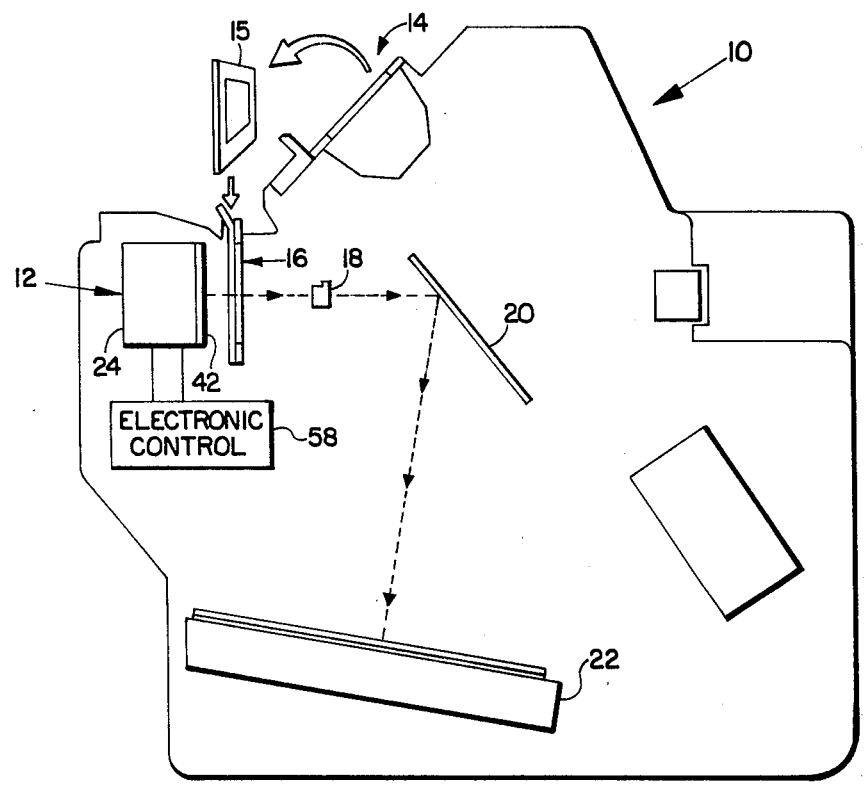
FIG. 2
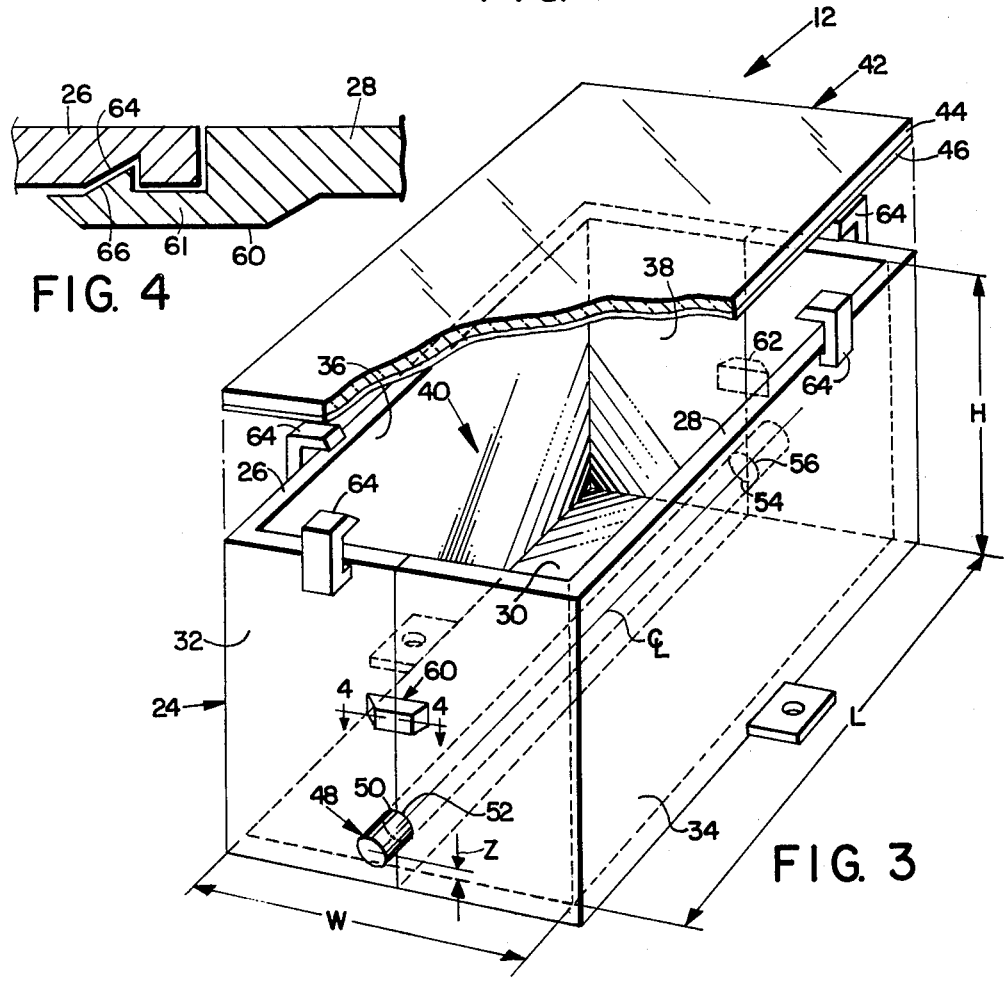
FIG. 4
FIG. 3

DEVICE FOR ILLUMINATING TRANSPARENCIES

BACKGROUND OF THE INVENTION

1. Field of the Invention

This invention in general relates to illumination devices and in particular to a lighting device for uniformly illuminating a transparency, such as a 35 mm color slide, for photocopying or projection purposes.

2. Description of the Prior Art

Devices for illuminating transparencies (e.g., 35 mm slides) for projection onto a viewing screen or onto film for photocopying are well-known in the prior art. Such illumination devices must not affect the definition of the final image and must, more or less, uniformly illuminate the transparency. Commonly, such devices comprise an illumination source, an associated concave reflector, and a condenser type optical system which operates to increase the efficiency of the system and to improve the evenness of illumination. To this end, the known condenser systems, which may comprise one or more lenses, usually image the source in the pupil of a projection lens so that the lens aperture has the same brightness as the source while the projection lens images the transparency, positioned between the condenser system and the projection lens, on the viewing screen or film used for photocopying.

Another type of known lighting device for evenly illuminating transparencies includes a housing and a mercury discharge lamp having a multiple coiled tube situated in the housing immediately adjacent an opal glass diffuser. However, the mercury discharge type lamp is unsuitable for color copying because of its spectral content.

Of the known transparency illumination devices, the condenser type is somewhat complex because it requires an auxiliary optical system while the mercury discharge lamp type is unsuitable because of its spectral content. Consequently, it is a primary object of the present invention to provide a simple lighting device for uniformly illuminating color transparencies for photocopying purposes.

It is another object of the present invention to provide a lighting device having only one source and a simplified reflector by which transparencies can be substantially uniformly illuminated for photocopying purposes or projection purposes.

Other objects of the invention will, in part, be obvious and will, in part, appear hereinafter. The invention, accordingly comprises the apparatus possessing the construction, combination of elements, and combination of parts which are exemplified in the following detailed disclosure.

SUMMARY OF THE INVENTION

This invention in general relates to illumination devices and, in particular, to a lighting device suitable for uniformly illuminating transparencies, such as 35 mm color slides, for photocopying or projection purposes.

The lighting device of the invention comprises an open-ended, rectangular parallelepiped-shaped housing having a base opposite the open-end thereof and four sides extending uprightly from the base, the housing has predetermined interior length (L), width (W), and height (H) and all of the interior surfaces thereof are specularly reflective.

Also included in the device is a partially reflecting-/diffusing opal glass screen located in parallel overlying relationship to the housing open-end.

An elongated source of artificial illumination is provided and is mounted in the housing so that its longitudinal axis is parallel to the plane containing the housing open-end and either two opposing upright sides of the housing and spaced away from the housing base by a distance (Z) which is closer to the housing base than to the housing open end.

The lighting device is then structured so that the specularly reflective interior surfaces of the housing in combination with the partially reflecting/diffusing opal glass screen interior surface cause multiple internal reflections of the artificial light source within the housing whereby a plurality of images of the artificial light source are formed on the interior surface of the opal glass screen and are diffused by the opal glass screen to provide a substantially uniform illumination across the exterior surface of the opal glass screen.

The lighting device of the invention is preferably structured so that for any selected values for any two of the dimensions, H, L and Z, the remaining dimension, H, L or Z, is determined by the expression:

$$\frac{L}{H - \frac{Z}{L}} = 1.62 \pm .05$$

whereby the variation in the illumination across the exterior surface of the opal glass screen is then percent or less.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiments when read in connection with the accompanying drawings wherein like numbers have been employed in the different figures to denote the same parts and wherein:

FIG. 2 is a diagrammatic sectional view of the copier of FIG. 1 taken generally along line 2—2 of FIG. 1;

FIG. 3 is a perspective view, with parts broken away, of the lighting device of the invention; and FIG. 4 is a sectional view of part of the invention taken generally along line 4—4 in FIG. 3.

DESCRIPTION OF THE PREFERRED EMBODIMENT

Figure 1:
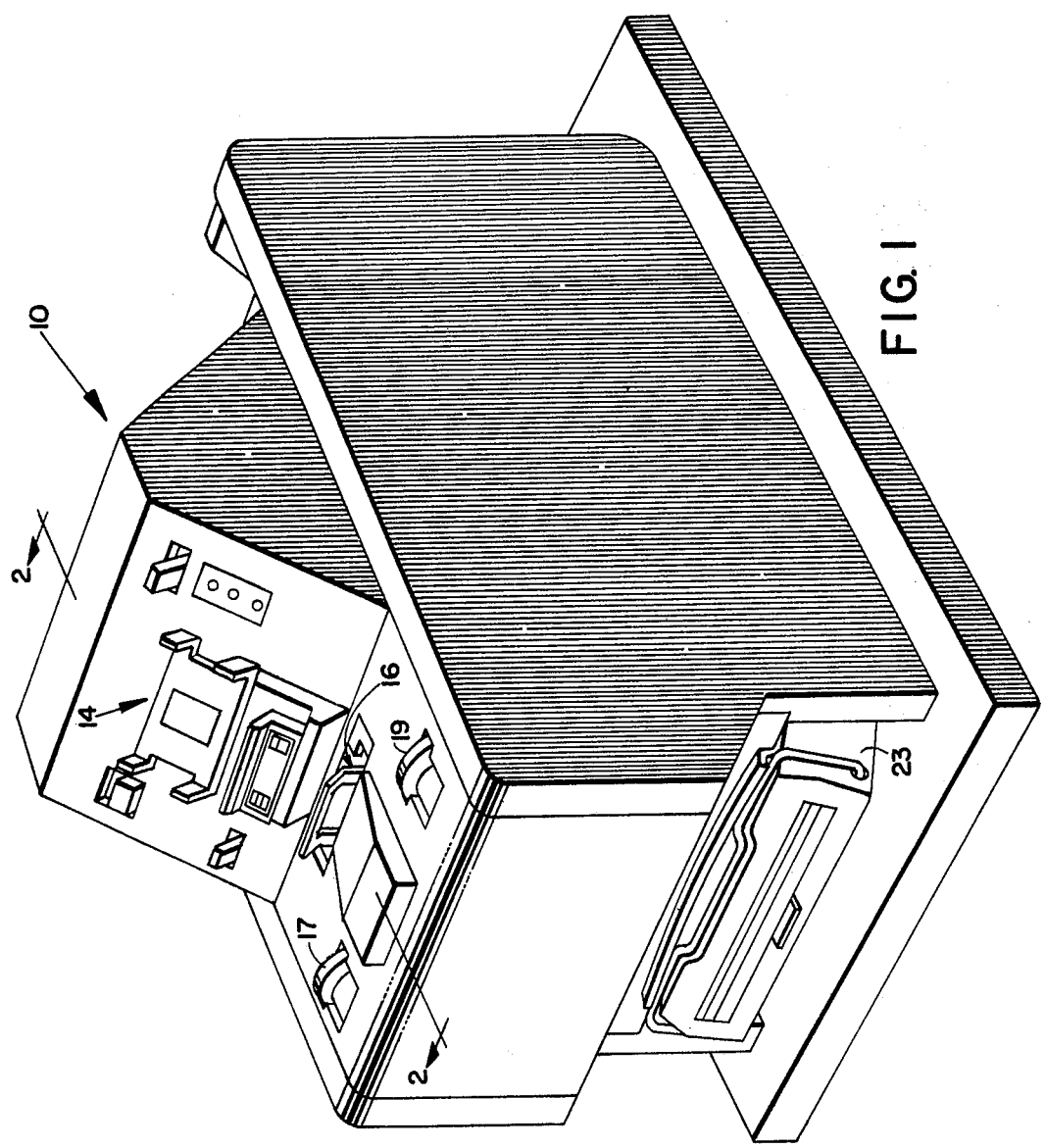
FIG. 1 is a perspective view of a 35 mm color slide copier in which the present invention is shown incorporated.

Referring now to FIGS. 1 and 2, there is shown generally designated at 10, a well-known commercially available slide copier which accepts glass, plastic or cardboard mounted 35 mm slides and makes $3\frac{1}{4} \times 4\frac{1}{4}$ inch prints in 60 seconds or less utilizing self-processable type film. The present invention in its preferred embodiment is a lighting device shown incorporated in the copier 10 for uniformly illuminating 35 mm slides to facilitate their copying and is designated generally at 12 in FIGS. 2 and 3. Although shown incorporated in the slide copier 10, the lighting device 12 of the present invention is not limited in its use to illuminate only 35 mm slides but, as will be seen, can be used to illuminate transparencies of other sizes for projection onto a viewing screen or onto film for photocopying. Consequently, all references to the slide copier 10 are made to provide background information and understanding of the environment in which the lighting device 12 has been found to be particularly useful. For a detailed explanation of the slide copier 10, reference may be had to U.S. patent application Ser. No. 152,744 filed on May 23, 1980 in the name Philip G. Baker et al. and entitled "Photographic Slide Copier With Adjustable Cropping System".

The slide copier 10 is designed to be light weight and portable and is equipped with a unique optical contrast control system and automatic electronic exposure control. A manual control 17 is used to adjust exposure and another manual control 19 is used to adjust contrast.

Operation of the slide copier 10 is simple and reqires no special set-ups. To make a copy, the user simply frames a slide, designated at 15, on an illuminated preview panel designated generally at 14. The preview panel 14 is equipped with a moving selector for cropping the contents of the slide after which the slide 15 is inserted into a copying station designated generally at 16.

Slide 15 is exposed automatically with even illumination provided in a manner to be described by the lighting device 12. The light from the illumination device 12 passes through the slide 15 and then through a three-element copy lens 18 that is fitted with a fixed elliptical aperture for facilitating contrast control. The copy lens 18 is mounted with a solenoid-activated electronic shutter which focuses the image without manual adjustement. Light emerging from the copy lens 18 is reflected from an optical mirror 20 onto a film unit contained in a film cassette 22 (see arrows) which is held in place in a film pack holder 23 (FIG. 1). After exposure of a film unit, it is pulled from the film pack 23 and is automatically processed in a well-known manner to yield the slide copy.

Referring now to FIG. 3, it can be seen that the lighting device 12 comprises an open-ended, rectangular parallelepiped-shaped housing generally designated at 24 and having a base 30 opposite the open end thereof. Four sides, designated at 32–38, extend uprightly from the base 30, and the upper interior edges of the uprightly extending sides, 32–38, define the perimeter of the housing open end.

The housing 24 is preferably formed of two bilaterally symmetric halves, 26 and 28. The housing halves, 26 and 28, are preferably molded of a glass-filled polycarbonate thermoplastic preferably having high dimensional stability performance. The housing 24 thus formed is provided with a predetermined interior length which is desingated at L, a width which is designated at W, and a height which is designated at H. In its preferred embodiment, the interior dimensions are 1.3×1.1×0.95 inches, respectively. With these dimensions the housing open-end area available for illuminating a transparency is 1.3×1.1 inches.

All of the interior surfaces of the housing 24 are coated with a thin film of aluminum that is deposited by evaporation in a vacuum in a well-known manner and is designated generally at 40. The aluminum coating may have a protective layer thereover comprising silicon monoxide or magnesium fluoride and has a broad spectral reflectivity which includes the visible region of the spectrum and extends beyond the far infrared. Over this region of the spectrum, the reflectivity of the aluminum coating 40 is approximately 90%. In this manner, all of the interior surfaces of the housing 24 are specularly reflective.

The housing halves 26 and 28 connect together via complementary configured snap-type connectors which are designated generally at 60 and 62 in FIG. 3. FIG. 4 shows the snap-type connector 60 in section and is representative of both of the snap-type connectors 60 and 62. As can be seen in FIG. 4, the snap-type connector 60 includes a flexible member 61 cantilevered from the housing half 28 and having at the end thereof a triangular-shaped lug 66 which fits into a complementary configured recess 64 located on the housing half 26. Through the use of the snap-type connectors 60 and 62, both housing halves, 26 and 28, can be easily connected to one another.

Included in the housing half 26 are a pair of circular cut out recesses, 50 and 54, and in the housing half 28 another pair of circular cut out recesses, 52 and 56. The circular recesses, 50–56, are adapted to receive and support portions of an elongated artificial light source 48 to facilitate the mounting of the light source 48 when the housing halves, 26 and 28, are connected to one another.

The artificial light source 48 is preferably a xenon electronic flash tube having a frosted glass envelope and is supported within the housing 24 so that its longitudinal axis (CL) is parallel to the plane containing the housing open-end and either two of the opposing upright sides of the housing. The longitudinal axis of the flash tube 48 is spaced away from the housing base 30 by a distance (Z) which is closer to the housing base 30 than to the housing open end. In the preferred embodiment, the frosted glass envelope of the xenon flash tube 48 just touches the surface or nearly touches the surface of the base 30 so that the dimension Z is approximately 0. A well-known electronic control 58 (FIG. 2) supplies power to and fires the flash tube 48 at appropriate times.

Located in parallel overlying relationship to the housing open end is a partially reflecting/diffusing opal glass screen 42 (FIG. 2 and 3) which comprises a colloidal suspension 46 affixed in a well-known manner to a glass plate 44. The colloidal suspension 46 preferably faces the interior of the housing 24. The opal glass screen 42 is preferably held in place over the open end of the housing 24 by means of snap-type connectors designated generally at 64.

The lighting device 12 is thus structured so that th specularly reflective interior surfaces of the housing 24 in combination with the partially reflecting/diffusing opal glass screen interior surface cause multiple internal reflections of the flash tube 48 within the housing 24 whereby a plurality of images of the flash tube 48 are formed on the interior surface of the opal glass screen 42 and are diffused by the opal glass screen 42 to provide a substantially uniform illumination across the exterior surface of the opal glass screen 42 when the flash tube 48 is triggered.

The measured uniformity of the illumination at the exterior surface of the opal glass screen 42 for the preferred embodiment varied no more than 7% over the entire exterior surface of the opal glass screen 42.

It has been discovered through empirical studies that the dimensions of the preferred embodiment can be changed in a predetermined manner to provide differently sized lighting devices similar in design and operation to the preferred embodiment and that such lighting devices will provide uniform illumination which varies 10% or less. To construct such lighting devices, values for any two of the dimensions, H, L and Z, are selected and the remaining dimension, H, L or Z, is determined by the expression:

$$\frac{L}{H - \frac{Z}{L}} = 1.62 \pm .05$$

As a matter of convenience, the length and width of the transparency intended to be illuminated can be chosen for the interior dimensions of the lighting device housing length, L, and width, W, and the bulb height, Z, solved for with the above expression.

A number of such lighting devices have been built and tested to verify the uniformity of their illumination. The largest such device was capable of illuminating a transparency of 24×24 inches. In this case, the height of the rectangular housing was 14.6 inches, and the bulb height, Z, was 0 because a frosted bulb was used. In cases where a bulb having a filament is used, the dimension Z is to be measured from the interior base surface of the rectangular housing to the filament rather than to the exterior envelope as in the case of frosted bulbs.

It will be obvious to those skilled in the art that other changes may be made in the above-described embodiment without departing from the scope of the invention. Therefore, it is intended that all matter contained in the above description or shown in the accompanying drawings shall be interpreted as illustrative and not in a limiting sense.

I claim:

1. A lighting device for illuminating transparencies, said lighting device comprising:
   an open-ended, rectangular parallelepiped-shaped housing having a base opposite said open-end thereof and four sides extending uprightly from said base, all of the interior surfaces thereof being specularly reflective;
   a partially reflecting/diffusing opal glass screen located in parallel overlying relationship to said housing open-end; and
   an elongated source of artificial illumination mounted in said housing so that its longitudinal axis is parallel to the plane containing said housing open-end and either two opposing ones of said upright sides and spaced away from said housing base by a distance which is closer to said housing base than to said housing open-end;
   said lighting device being structured so that said specularly reflective interior surfaces of said housing in combination with said partially reflecting/diffusing opal glass screen interior surface cause multiple internal reflections of said artificial light source within said housing whereby a plurality of images of said artificial light source are formed on the interior surface of said opal glass screen and are diffused by said opal glass screen to provide a substantially uniform illumination across the exterior surface of said opal glass screen.

2. The lighting device of claim 1 wherein said housing has predetermined interior length (L), width (W), height (H), and said source distance above said housing base is specified as Z and wherein for any selected values for any tow of said dimensions, H, L and Z, the remaining dimension, H, L or Z, is determined by the expression:

$$\frac{L}{H - \frac{Z}{L}} = 1.62 \pm .05$$

whereby the variation in the illumination across the exterior surface of said opal glass screen is ten percent or less.

3. The lighting device of claim 2 wherein said open-ended housing is formed of two plastic injection molded halves which are bilaterally symmetric about a central plane perpendicular to said base of said housing and wherein said specularly reflective surfaces comprise mirror-like reflective coatings vacuum deposited on the interior surfaces of said housing halves.

4. The lighting device of claim 3 wherein each of said housing halves include complementary configured snap type connectors structured to connect said housing halves to one another and also include recessed portions adapted to receive portions of said artificial light source therein to facilitate supporting said artificial light source when said housing halves are connected to one another.

5. The lighting device of claim 4 wherein said artificial light source comprises an electronic flash tube.

* * * * *